United States Patent Office 3,110,421
Patented Nov. 12, 1963

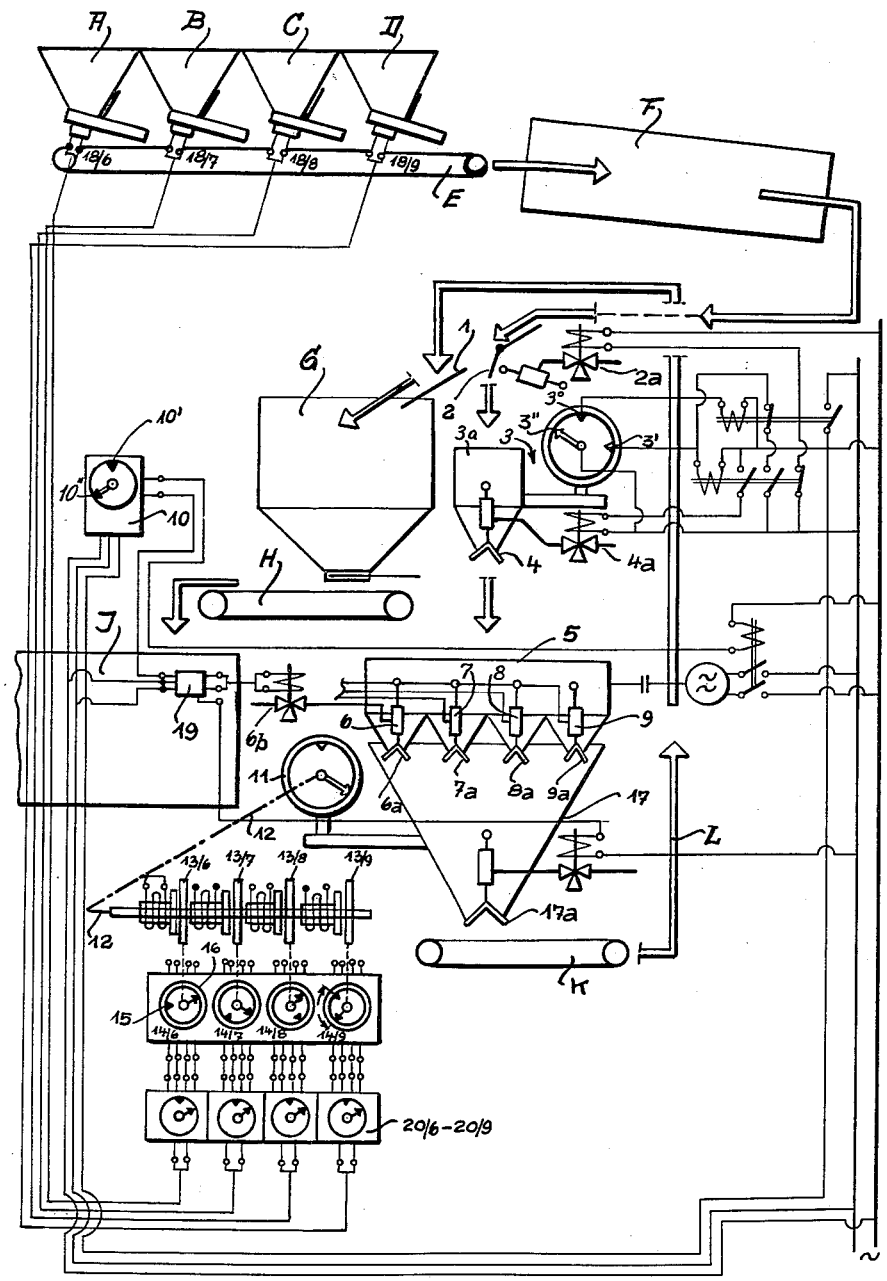

3,110,421
SUPERVISING APPARATUS FOR MAINTAINING PREDETERMINED MIXTURE PROPORTIONS IN THE DRY CONSTITUENTS OF A MIXTURE MORE PARTICULARLY FOR ROAD CONSTRUCTION
Karl Heinrich Matthias, Wurzburger Strasse, Bad Orb, Germany
Filed May 24, 1961, Ser. No. 169,157
10 Claims. (Cl. 222—57)

In many branches of the technical world it is necessary to mix two or more dry constituents of different grain size with one another in a pre-determined ratio. For this purpose, it is known to supply the various constituents to the mixing apparatus from storage containers by way of proportioning belt-type weighing machines which control the outlet from the various storage containers or the rate of feed. In many cases, for example when the mixture material is extremely sensitive to moisture, the material is passed through a drying drum before being delivered to the mixer. In this case, the measuring operation carried out by means of individual belt-type weighing machines is not adequately reliable since the moisture which will later be expelled has been weighed also along with the material.

In order to compensate for this defect in the proportioning capacity belt-type weighing machines, it is known to take off a specific proportion of the material on its way from the drying drum to the mixer, to break down proportion into its individual constituents, and to regulate the feed quantities in accordance with the result.

Regulation in accordance with the dry weight of the individual constituents is of great importance more particularly in the preparation of mixtures of solid substances for the production of bituminous surfacings in road construction, since the mixing installations required for this are on building sites where they are subjected to all the influences of the weather conditions, and to where the materials are delivered in very widely varying conditions as regards moisture content.

The invention relates to a supervising apparatus of the last-mentioned construction, i.e. wherein the mixture material is tested as regards its composition before being supplied to the place where it will be used, and the feed quantities of the individual mixture constituents are regulated in accordance with the result of the test.

According to the invention, in a supervising apparatus of this kind, the sorting device is provided with a collecting bin for each constituent, the bins being followed by a weighing device whose indicating element can be quantity-correcting devices associated with the proportioning means of the storage containers.

Thus, only one weighing device is provided for the sorted mixture material. The outlet flap of the first collecting bin is controlled in dependance on the expiry of the previously adjustable screening time and the outlet flap of the weighing device is controlled in an opposite sense in dependance on the outlets of the collecting bins, this control being adapted to be communicated to the successive outlet flaps.

The pointer of the weighing device can be connected selectively to the quantity-correcting devices by means of magnetic couplings controlled by the outlet flaps of the collecting bins. The quantity-correcting devices have a desired-value pointer and an actual-value pointer indicating the result of weighing, each pointer controlling a resistance, and the voltage difference between the two resistances being used for controlling the delivery chutes of the supply containers.

The device for taking off the necessary sample in each case consists of a flap which is interposed in the path of travel of the material towards an intermediate container, a further weighing device being arranged downstream of the said flap, the flap and the outlet of this weighing device being mutually controlled by the attainment of the pre-determined desired weight value. However, a locking means is interposed in this control system, being operated by the outlet of the last collecting bin in order to prevent further sample material from arriving at the sorting device before this latter is completely emptied.

The novel construction will be explained in more detail hereinafter with reference to the diagrammatic view of one installation which is illustrated in the drawing.

This drawing is based on an installation wherein four mixture constituents are to be mixed together in specific proportion relatively to one another.

The four constituents are accommodated in the storage containers A, B, C, D, and are discharged therefrom by way of proportioning devices 18/6–18/9 to a conveyor belt E which delivers them to a drying drum F. The mixture material passes from the drying drum by way of chutes, conveyor belts or similar means into an intermediate bin G from where it is discharged continuously or in batches to the mixer I by way of a conveyor belt H.

The conveying chute 1 is provided with a deflecting flap 2 which can be opened to discharge a pre-determined quantity of material to a weighing device 3 in accordance with the length of time the said flap is open. The weighing device 3 is provided with preset pointer 3' which is previously adjusted to the actual quantity of material which is to be taken off as a sample in each case. The actual-value pointer 3" of the weighing device 3, as soon as it comes into register with the pre-set pointer 3', closes a control circuit for a driving unit 2' which returns the flap 2 to its closed position. This construction ensures that a pre-determined constant quantity of material is branched-off each time from the stream of mixture material.

The container 3a of the weighing device 3 is provided with an emptying flap 4 which can be brought into the open position and the closed position by a driving unit 4a. Control is effected by means of a control circuit which, when the actual-value pointer 3" registers with the pre-set pointer 3', brings the unit 4a into action in the sense of opening the flap 4, whilst when the pointer 3" is in register with the zero mark 3° of the weighing device, a second circuit switches the unit 4a to the closing operation.

This circuit influenced by the zero mark 3° of the weighing device and by the actual-value pointer at the same time influences the driving 2a for the flap 2 so as to initiate the opening movement for the said flap.

The control connection achieves the result that during the emptying of the container 3a of the weighing device, no further material is taken off for passing to the said container. Only when the container 3a has been completely emptied and the actual-value pointer 3" has returned to the zero position, is the next sample taken off by opening the flap 2, after closing the flap 4.

Arranged downstream of the weighing device 3, below the emptying flap 4, is a sorting screen 5 with four screen bins 6, 7, 8, 9, the closure flaps 6a, 7a, 8a, 9a of the screen bins delivering the material to a collecting hopper 17 having a closure flap 17a, from which the said material is returned to the intermediate bin G by way of known conveying means such as a conveyor belt K, elevator L or the like.

The drive of the sorting screen 5 is controlled by the circuit which is closed upon the return of the actual-value pointer 3" of the weighing device 3 to the zero position. This circuit brings into operation the drive of the sorting screen 5 and at the same time a time switch 10 which can be adjusted to a specific period of time substantially corresponding to the time required for the separation of

and for moving said discharge means to said active position when said movable pointer is aligned with said zero pointer.

9. An arrangement as defined in claim 2 in which said intermediate take-off means includes discharge means movable between a rest position and an operative position and cooperating with said conveying means for discharging in said operating position the material conveyed by said conveying means into a weighing device, in which said weighing device includes a container adapted to receive the material discharged by said discharge means and being provided with outlet means for discharging material from said container; and locking means cooperating with said outlet flaps of said collecting bins and said outlet means of said container of said weighing device to keep said outlet means closed until the material supplied to said collecting bins has been discharged from all of said collecting bins through said outlet flaps thereof.

10. An arrangement as defined in claim 1 and including drying means arranged intermediate said plurality of storage containers and said intermittent take-off means for drying the material discharge from said storage containers before said material is intermittently discharged by said intermittent take-off means.

References Cited in the file of this patent
UNITED STATES PATENTS

| | | |
|---|---|---|
| 1,727,353 | Merrick | Sept. 10, 1929 |
| 2,921,712 | Dickerson | Jan. 19, 1960 |